Figure 1:
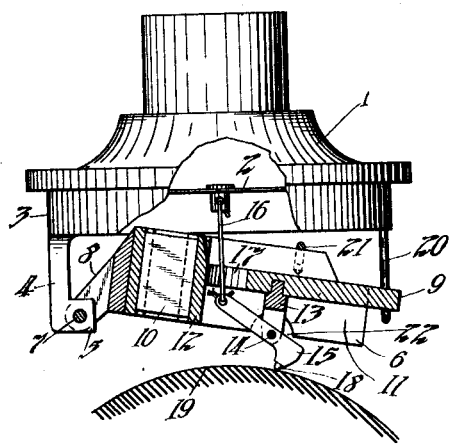

A. N. PIERMAN.
PHONOGRAPH REPRODUCER.
APPLICATION FILED MAR. 23, 1912.

1,119,113.

Patented Dec. 1, 1914.

Witnesses:
H. B. Dressler
W. C. Hardy

Inventor:
Alexander N. Pierman
by Frank L. Dyer
his Atty

UNITED STATES PATENT OFFICE.

ALEXANDER N. PIERMAN, OF NEWARK, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

PHONOGRAPH-REPRODUCER.

1,119,113. Specification of Letters Patent. Patented Dec. 1, 1914.

Application filed March 23, 1912. Serial No. 685,836.

*To all whom it may concern:*

Be it known that I, ALEXANDER N. PIERMAN, a citizen of the United States, residing at Newark, in the county of Essex and State of New Jersey, have invented certain new and useful Improvements in Phonograph-Reproducers, of which the following is a full, clear, and concise description.

The present invention relates to phonograph reproducers and has for its object the provision of an improved mounting for the stylus lever, wherein all looseness in the connections of parts is obviated, which renders the reproducer capable of withstanding jarring without causing the stylus to skip from one thread of a record to another and thus insures the exact tracking and reproduction of a record.

It is customary in reproducers, as now constructed, to pivotally mount the floating weight on the sound box, to provide a member, pivotally connected to the weight for carrying the stylus lever, and to provide separate means, such as a spring, for normally holding the member in central position while allowing lateral movements thereof. This construction is objectionable owing to the impossibility of making a sufficiently tight fit in the pivotal connection of the floating weight and member, the looseness existing therein, and which increases with use, frequently resulting in the jumping or skipping of the stylus from one thread of a record to another when the reproducer is jarred, giving a faulty reproduction and producing foreign and objectionable sounds.

In overcoming the objections indicated, I preferably construct my reproducer as follows: A floating weight is pivotally mounted on a reproducer sound box of usual construction, a member of small inertia compared with that of the weight is employed for carrying the stylus lever, which is connected to the diaphragm mounted in the sound box in any suitable manner, and the member is mounted on the weight by means of a resilient member rigidly connected at its ends to the weight and member respectively. This resilient connection between the weight and member may be of any suitable construction, but as shown is a very thin flat sensitive spring of any suitable material, such as spring steel, which normally maintains the member carrying the stylus lever in central position while allowing lateral movement of the member with respect to the weight so as to permit the stylus to faithfully follow all irregularities in the record threads. In a reproducer constructed in accordance with my invention, the stylus will not skip from one thread to another when the reproducer is jarred, for all looseness in the connection between the floating weight and member carrying the stylus lever is obviated.

Other objects of my invention reside in the features hereinafter described and claimed.

Figure 3:
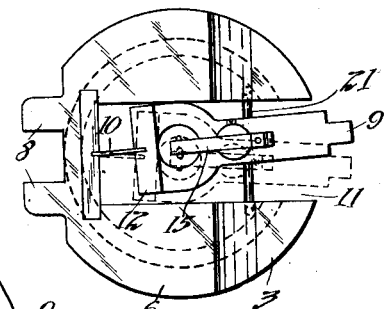
Figure 2:
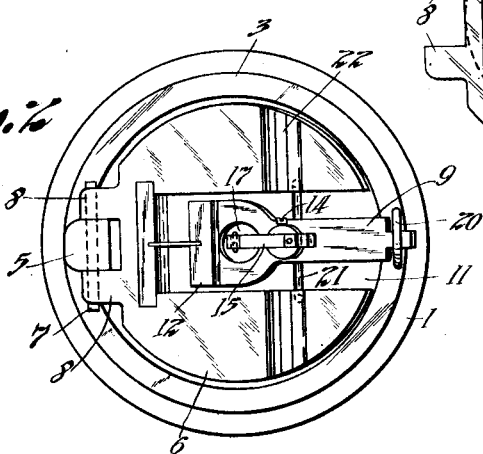

In order that my invention may be more clearly understood, reference is made to the accompanying drawing forming a part of the specification in which the same reference characters are used to designate corresponding parts throughout and in which:

Figure 1 is an elevation partly broken away, and partly in section, showing a reproducer constructed in accordance with my invention; Fig. 2 is a bottom view of Fig. 1; and Fig. 3 is a view similar to Fig. 2, showing different positions of the member carrying the stylus lever, the sound box body being omitted.

The sound box body 1 is provided with a suitable diaphragm 2, held in position in any suitable manner, and with an annular rim or flange 3. Flange 3 is provided with a depending member 4, which may be of any suitable form, but is here shown as a bracket integral with flange 3, and having a laterally extending lug 5. Floating weight 6 is connected to member 4 in any suitable manner, but preferably by means of a pivot pin or stud 7 carried by a pair of lugs 8, 8 on the weight, the pin being mounted in lug 5, and lugs 8, 8, which closely engage the sides of lug 5 to prevent lateral movement of the weight with respect to the sound box. This preferable manner of mounting the weight confines its movement to a direction substantially at right angles to the plane of diaphragm 2. A member 9 of small inertia compared with floating weight 6, is connected to said weight by any suitable resilient means, as for example, by a very thin, flat and sensitive spring 10 of any suitable material, such as spring steel, rigidly connected at its ends to floating weight 6 and member 9 respectively. Part 9 is shown as an elongated member which is preferably mounted in a position substantially parallel with floating weight 6 and within said weight by providing a central recess 11 in said weight of sufficient width to allow considerable lateral movement of the member therein, as shown by full and dotted lines in Fig. 3. Resilient member 10 is shown as arranged in a vertical position with one of its ends securely fixed to weight 6, at the center of the wall closing the end of recess 11, while the other end of member 10 is fixed to the flat end 12 of member 9 at its vertical center line. The resilient member 10 normally maintains member 9 in a central position with respect to the floating weight 6 and when member 9 is in normal position the longitudinal axes of members 6 and 9 are in substantially the same plane.

Mounted on member 9 in any suitable way as by a yoke 13 fastened to the under side of said member and pivot pin 14 is a stylus lever 15 connected to diaphragm 2 in any suitable manner, as by link 16 passing through an aperture 17 provided in said member 9. Stylus lever 15 carries the usual stylus 18 adapted to track the threads of the record, a portion of which is shown at 19 in Fig. 1. Lateral movement of member 9 with respect to the diaphragm, and in the example shown also with respect to the floating weight, is confined within limits, by reason of the free end of said member being received in a stirrup 20 depending from the sound box body 1. Member 21 is a brace connecting the separated end portions of weight 6, formed by recess or slot 11. Weight 6 is provided with the usual groove 22 in order that the mounting of stylus lever 15 on member 9 may be readily accessible.

According to the preferred form of my invention, all movements of the stylus resulting from large surface irregularities are provided for by the pivotal connection of the weight to the sound box body, while all lateral movement of the stylus with respect to the sound box body are taken care of by the mounting for the stylus lever forming the special feature of my invention. Resilient member 10 is free from stress only when member 9 is in its central position. A force acting to move member 9 to either side of its central position places member 10 under a slight stress to gently return the member 9 to its central position, when the force ceases to so act.

It is to be understood that I am in no way limited to the particular form of my invention illustrated and described but only by the spirit thereof as disclosed in the specification and claims.

Having thus fully described my invention and the preferred form of carrying the same into effect, what I claim and desire to protect by Letters Patent of the United States is as follows:

1. A phonograph reproducer comprising a floating weight, a stylus lever, a member provided with a fulcrum for said lever about which fulcrum the lever is arranged to oscillate in accordance with the vibrations imparted to the stylus by the undulations of a sound record groove, and resilient means for supporting said member from the floating weight, for normally holding said member in a position in line with that portion of the record groove in engagement with the stylus and adapted to return it to such position after the cessation of any force tending to move it therefrom, substantially as described.

2. In a phonograph reproducer, the combination with the sound box body and diaphragm mounted therein, of a floating weight pivoted to said body and movable in a direction intersecting the plane of the diaphragm, a stylus lever connected to the diaphragm, a member provided with a fulcrum for said lever about which fulcrum the lever is arranged to oscillate in accordance with the vibrations imparted to the stylus by the undulations of the sound record groove and a spring fixed at one end to said floating weight and supporting said member from its free end, said spring normally holding said member in a position in line with that portion of the record groove in engagement with the stylus and adapted to return it to such position after the cessation of any force tending to move it therefrom, substantially as described.

3. In a phonograph reproducer, the combination with the sound box body and diaphragm mounted therein, of a floating weight pivoted to said body, a stylus lever connected with the diaphragm, an elongated member of small inertia compared with the weight and provided with a pivot for said lever, said lever being arranged to oscillate about said pivot in accordance with the vibrations imparted to the stylus by the undulations of the sound record groove and a spring secured at one end to said weight and supporting said member from its other end, said spring normally holding said member in a predetermined position with respect to said weight and being under stress when said member is moved from said predetermined position, substantially as described.

4. In a phonograph reproducer, the combination with the sound box body and diaphragm mounted therein, of a floating weight pivoted to said body, an elongated member of small inertia compared with the weight and carrying a stylus lever which is connected with the diaphragm, and a spring secured at one end to said weight and supporting said member from its other end, said spring normally holding said member in a predetermined position with respect to said weight and being under stress when said member is moved from said predetermined position, the longitudinal axes of the weight and member being substantially in the same plane when the member is in its normal position, substantially as described.

5. A phonograph reproducer comprising a floating weight, a stylus lever, a member provided with a fulcrum for said lever about which fulcrum the lever is arranged to oscillate in accordance with the vibrations imparted to the stylus by the undulations of a sound record groove, and resilient means for supporting said member from the floating weight, said means being adapted to normally maintain the member in a predetermined position with respect to the floating weight and being placed under stress when said member is moved from said predetermined position, substantially as described.

This specification signed and witnessed this 21st day of March, 1912.

ALEXANDER N. PIERMAN.

Witnesses:
WILLIAM A. HARDY,
ANNA R. KLEHM.